(No Model.)
J. W. LEWIS & W. J. ESTEP.
BAIT BOX.
No. 503,722. Patented Aug. 22, 1893.
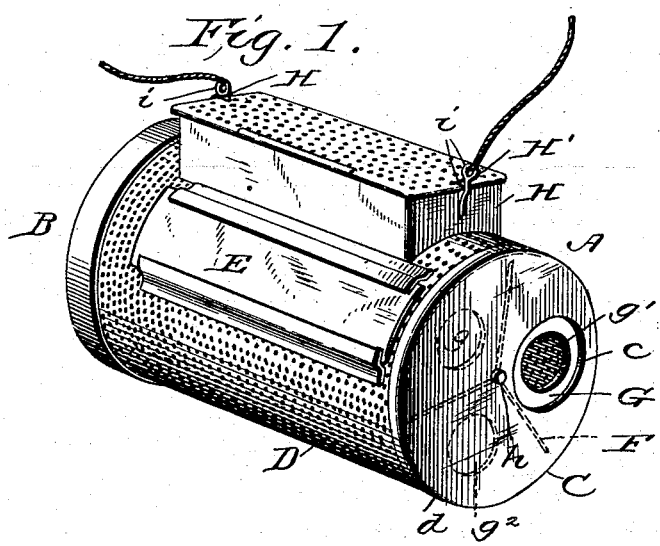
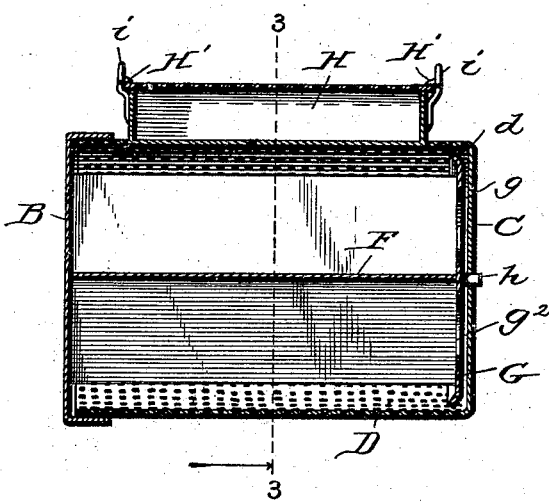
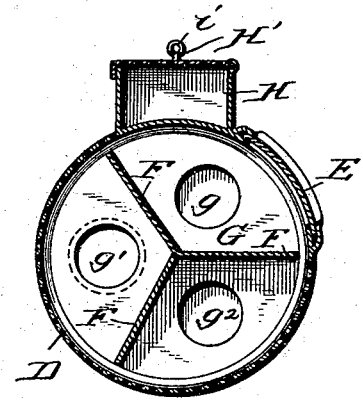

UNITED STATES PATENT OFFICE.

JAMES W. LEWIS AND WILLIAM J. ESTEP, OF GANISTER, PENNSYLVANIA.

BAIT-BOX.

SPECIFICATION forming part of Letters Patent No. 503,722, dated August 22, 1893.

Application filed June 15, 1893. Serial No. 477,732. (No model.)

*To all whom it may concern:*

Be it known that we, JAMES W. LEWIS and WILLIAM J. ESTEP, citizens of the United States, residing at Ganister, in the county of Blair and State of Pennsylvania, have jointly invented certain new and useful Improvements in Bait-Boxes, of which the following is a specification.

The object of our invention is to provide a bait box having several compartments to hold different kinds of bait in such manner that they are separated from each other, but may be readily withdrawn when desired.

In the accompanying drawings,—Figure 1 is a perspective view of our improved bait box. Fig. 2 is a longitudinal, central section thereof. Fig. 3 is a transverse section on the line 3—3 of Fig. 2.

We preferably make the main body, of the bait box, cylindrical. The circular end piece B, is imperforate and the opposite end piece C, is imperforate except that it has a single opening $c$, through which the bait is removed. The body portion D, between the end pieces B and C, is perforated. It is permanently secured at $d$ to the end piece C, and is loosely connected with the end piece B, which is free to revolve on the body D. An opening, closed by a sliding door E, is formed in the body portion D, through which the bait is fed into the box.

In order to divide the interior of the box into compartments, we secure to the end piece B, a series of partitions F, three being shown, see Fig. 3. These partitions radiate from the axis of the end piece, and extend from the end piece B to the end piece G, which is adjacent to and parallel with the end piece C. The end piece G, is provided with a series of openings $g$, $g'$ $g^2$, which is adapted to register with the opening $c$. The partitions F, extend from the axis of the box close to the inside of the body portion D, thereof, so that communication between the several compartments is cut off.

We secure the end piece G, to the end piece C, by means of a wire or rivet $h$, which prevents endwise movement of the rotary portion of the box relatively to the casing, and yet permits the compartments to rotate within the casing.

On the outside of the casing D, we secure a supplemental box H, the bottom, two sides and two end pieces of which are imperforate, while the top is preferably perforated. This top is hinged and catches H' hold it securely when closed. These catches may be provided with eyes $i$, to which a string or strap may be secured.

A bait box thus constructed is adapted to hold four different kinds of bait. The three compartments within the main body of the box may be used for holding grass-hoppers, bugs and toads or any other like bait, while the box H, may be used for red bait.

In filling the box, the door E, is opened and one of the compartments brought into position under the door. This compartment is filled, and is moved past the door, another compartment being brought into position, which is in like manner filled.

The perforations in the body portion D, permit sufficient ventilation to keep the bait alive. The worms or other bait may be placed in the compartment or box H, and the door closed, as above described. The manner of withdrawing the bait from the box H, is obvious. In order to withdraw bait from the compartments of the main box, we turn the end piece B, until the opening $g$ $g'$ or $g^2$ registers with the opening $c$. By then standing the box on end, or shaking it, or inserting the fingers into the openings, the desired bait may be withdrawn. When withdrawn, the end piece B, may be given a slight turn until all the openings are closed.

We do not limit our invention to the precise construction shown, nor to the specific number of compartments illustrated. Various changes of this kind may be made without departing from the novel features of our invention.

We claim as our invention—

1. A bait box comprising a casing, a series of partitions within the casing and movable therein, openings in the compartments and an opening in the casing adapted to register with the openings in the compartments.

2. A bait box comprising end pieces, and a perforated body portion, a series of partitions within the casing forming a series of compartments, an end piece secured to the partitions and provided with an opening for each compartment adapted to register with an opening in one of the end pieces.

3. A bait box comprising two end pieces and a cylindrical perforated body portion, a series of partitions secured to one end piece and turning therewith, a supplemental interior end piece provided with openings for the several compartments formed by the partition and adapted to register with an opening in one of the end pieces.

4. A bait box comprising end pieces and a perforated body portion, a series of partitions within the body portion and rotating with one end piece, openings in the compartments formed by the partitions adapted to register with an opening in one of the end pieces, and a supplemental box secured to the outside of the casing and provided with a door, substantially as described.

5. A bait box comprising a perforated body portion, an end piece rigidly secured thereto, a rotary end piece, a series of partitions secured thereto and turning therewith, a supplemental end piece adjacent to the stationary end piece, and provided with openings adapted to register with the opening in the stationary end piece, a door in the body portion of the box, a supplemental compartment or box secured to the outside of the body portion of the main box, and provided with a door, substantially as described.

In testimony whereof we have hereunto subscribed our names.

JAMES W. LEWIS.
WM. J. ESTEP.

Witnesses:
WILHELM BACKHEMER,
ROBERT W. SMITH.